US007797687B2

(12) United States Patent
Tillmann et al.

(10) Patent No.: US 7,797,687 B2
(45) Date of Patent: Sep. 14, 2010

(54) PARAMETERIZED UNIT TESTS WITH BEHAVIORAL PURITY AXIOMS

(75) Inventors: Nikolai Tillmann, Redmond, WA (US); Wolfgang Grieskamp, Redmond, WA (US); Wolfram Schulte, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1108 days.

(21) Appl. No.: 11/198,569

(22) Filed: Aug. 4, 2005

(65) Prior Publication Data

US 2007/0033440 A1   Feb. 8, 2007

(51) Int. Cl.
*G06F 9/44* (2006.01)
*G06F 11/00* (2006.01)
(52) U.S. Cl. .................. 717/131; 717/135; 717/124; 714/38; 714/45; 714/49
(58) Field of Classification Search ................. None
See application file for complete search history.

(56) References Cited

U.S. PATENT DOCUMENTS

| 5,784,553 | A  | 7/1998  | Kolawa et al.   |
|-----------|----|---------|-----------------|
| 7,089,542 | B2 | 8/2006  | Brand et al.    |
| 7,373,636 | B2 | 5/2008  | Barry et al.    |
| 7,389,223 | B2 | 6/2008  | Atkin et al.    |
| 7,496,791 | B2 | 2/2009  | Tillmann et al. |
| 7,587,636 | B2 | 9/2009  | Tillmann et al. |
| 2003/0097650 | A1 | 5/2003 | Bahrs et al.   |
| 2004/0117772 | A1 | 6/2004 | Brand et al.   |
| 2004/0243951 | A1 | 12/2004 | Hall           |
| 2005/0050391 | A1 | 3/2005  | Grieskamp et al. |
| 2005/0120274 | A1 | 6/2005  | Haghighat et al. |
| 2005/0204201 | A1 | 9/2005  | Meenakshisundaram et al. |
| 2005/0223362 | A1 | 10/2005 | Whitlock et al. |
| 2006/0085156 | A1 | 4/2006  | Kolawa et al.  |
| 2006/0253739 | A1 | 11/2006 | Godefroid et al. |

OTHER PUBLICATIONS

Sidney L. Hantler and James C. King. "An Introduction to Proving the Correctness of Programs." ACM Computing Surveys (CSUR) vol. 8 , Issue 3 (Sep. 1976) pp. 331-353.*
Nikolai Tillmann, Wolfram Schulte, Wolfgang Grieskamp. "Parameterized Unit Tests." Microsoft Research Technical Report. May 2005.*

(Continued)

*Primary Examiner*—Michael J Yigdall
*Assistant Examiner*—Erika Kretzmer
(74) *Attorney, Agent, or Firm*—Klarquist Sparkman, LLP

(57) ABSTRACT

Separation of parameterized unit tests (PUTs) from specific test cases supports many benefits including automated test case generation. Symbolic execution assigns symbolic input variables to parameters of a parameterized unit test. Path constraints of an implementation under test (IUT) are identified during symbolic execution. A constraint solver automatically generates test cases by determining the test inputs that satisfy one of more paths, each described by constraints, through the IUT. PUTs are used to populate behavioral summaries. Behavioral summaries are used later in future symbolic executions to emulate summarized methods. Behavioral summaries comprise behavioral purity axioms. Behavioral purity axioms require that an intensional heap before execution of a PUT be equal to the intensional heap after execution. An intensional heap is provided to represent state changes performed by summarized methods. The extensional heap is used to explicitly update memory locations, e.g. object fields or array elements.

20 Claims, 5 Drawing Sheets

OTHER PUBLICATIONS

Nikolai Tillmann, Wolfram Schulte. "Parameterized Unit Tests." ESEC/FSE'05. Sep. 5, 2005.*

Jian Zhang, Chen Xu and Xiaoliang Wang. "Path-Oriented Test Data Generation Using Symbolic Execution and Constraint Solving Techniques." Proceedings of the Software Engineering and Formal Methods, Second International Conference. Sep. 28, 2004. pp. 242-250.*

Babić, Domagoj, and Madanlal Musuvathi. "Modular Arithmetic Decision Procedure." Jul. 18, 2005. Microsoft Technical Reports TR-2005-114. pp. 1-10. Retrieved from http://research.microsoft.com/pubs/70210/tr-2005-114.pdf on Jun. 23, 2009.*

Tillmann, Nikolai and Jonathan de Halleux. "Parameterized Unit Testing with Microsoft Pex. Chapter 4. Parameterized Unit Testing" Dec. 18, 2009. Microsoft Research. pp. 1-3 and 21-25. Retrieved from http://research.microsoft.com/en-us/projects/pex/pextutorial.pdf on Jan. 12, 2010.*

Colby et al., "Automatically Closing Open Reactive Programs," *Proceedings of 1998 ACM SIGPLAN Conference on Programming Language Design and Implementation*, Jun. 1998, 14 pages.

MacKinnon et al., "Endo-Testing: Unit Testing with Mock Objects," *eXtreme Programming and Flexible Processes in Software Engineering—XP2000*, 2000, 9 pages.

Tillmann et al., "Unit Tests Reloaded: Parameterized Unit Testing with Symbolic Execution," *MSR-TR-2005-153*, Nov. 2005, 17 pages.

Ambert et al., "BZ-TT: A Tool-Set for Test Generation from Z and B using Constraint Logic Programming," *Formal Approaches to Testing of Software, FATES 2002 workshop of CONCUR '02*, INRIA Report, Aug. 2002, pp. 105-119.

Ball, "Formalizing Counterexample-driven Refinement with Weakest Preconditions," *Proceedings of 2004 Marktoberdorf Summer School*, Dec. 10, 2004, 19 pages.

Barnett et al., "The Spec# Programming System: An Overview," *Construction and Analysis of Safe, Secure, and Interoperable Smart Devices: International Workshop, CASSIS 2004*, vol. 3362 of *LNCS*, 2005, pp. 49-69.

Barnett et al., "99.44% pure: Useful Abstractions in Specifications," *Conference Proceedings ICIS report NIII-R0426, University of Nijmegen*, 2004, pp. 11-19.

Bernot et al., "Software testing based on formal specifications: a theory and a tool," *Softw. Eng. J.*, 6(6)387-405, 1991.

Bidoit et al., "Algebraic system specification and development," *Springer-Verlag*, Chapter 1, 1991, 12 pages.

Bierman et al., "MJ: An imperative core calculus for Java and Java with effects," *University of Cambridge Computer Laboratory*, Technical Report 563, 2003, 53 pages.

Boyapati et al., "Korat: Automated Testing Based on Java Predicates," *Proc. International Symposium on Software Testing and Analysis*, 2002, pp. 123-133.

Brucker et al., "Symbolic Test Case Generation for Primitive Recursive Functions," *FATES*, vol. 3395 of *Lecture Notes in Computer Science*, Springer, 2004, pp. 16-32.

Bush et al., "A static analyzer for finding dynamic programming errors," *Softw. Pract. Exper.*, 30(7):775-802, 2000.

Csallner et al., "Check 'n' Crash: Combining Static Checking and Testing," *27th International Conference on Software Engineering*, May 2005, pp. 422-431.

Csallner et al., "JCrasher: an automatic robustness tester for Java," *Software—Practice & Experience 2004*, Dec. 18, 2003, pp. 1025-1051.

Detlefs et al., "Simplify: A Theorem Prover for Program Checking," *Hewlett Packard Systems Research Center*, 2003, 121 pages.

Dick et al., "Automating the Generation and Sequencing of Test Cases from Model-Based Specifications," *Industrial Strength Formal Methods, Formal Methods Europe (FME '93), Proceedings*, vol. 670 of *LNCS*, Springer, 1993, pp. 268-284.

Doong et al., "The ASTOOT Approach to Testing Object-Oriented Programs," *ACM Trans. Softw. Eng. Methodol.*, 3(2):101-130, 1994.

Flanagan et al., "Extended Static Checking for Java," *Proc. the ACM SIGPLAN 2002 Conference on Programming language design and implementation*, ACM Press, 2002, pp. 234-245.

Henkel et al., "Discovering Algebraic Specifications from Java Classes," *Proc. 17th European Conference on Object-Oriented Programming*, 2003, pp. 431-456.

JCrasher documents, http://www.cc.gatech.edu/~csallnch/jcrasher, 11 pages, downloaded Aug. 4, 2004.

Jalote, "Testing the Completeness of Specifications," *IEEE Trans. Softw. Eng.*, 15(5):526-531, 1989.

Jeffries et al., "Extreme Programming Installed," Chapters 13, 14, and 29, *Addison Wesley*, Oct. 2000, 30 pages.

King, "Symbolic Execution and Program Testing," *Commun. ACM*, 19(7):385-394, 1976.

Lahiri et al., "An Efficient Decision Procedure for UTVPI Constraints," *Technical Report MSR-TR-2005-67*, Jun. 15, 2005, 18 pages.

Lahiri et al., "An Efficient Nelson-Oppen Decision Procedure for Difference Constraints over Rationals," *Technical Report MSR-TR-2005-61*, May 26, 2005, 16 pages.

Lahiri et al., Predicate Abstraction via Symbolic Decision Procedures, *Technical Report MSR-TR-2005-53*, May 26, 2005, 19 pages.

Leino et al., "A two-tier technique for supporting quantifiers in a lazily proof-explicating theorem prover," *TACAS 2005*, Oct. 2004, 13 pages.

Loeckx et al., "The Foundations of Program Verification, 2nd Edition," Chapter 6, *Wiley*, 1987, 23 pages.

Marinov et al., "TestEra: A Novel Framework for Automated Testing of Java Programs," *Proc. 16th IEEE International Conference on Automated Software Engineering*, 2001, pp. 22-31.

Newkirk et al., "Test-Driven Development in Microsoft .NET," Chapters 2, 5, 7, 8, 9, 10, and Appendix A, *Microsoft Press*, Apr. 2004, 163 pages.

NUnit. http://www.nunit.org/, downloaded Aug. 4, 2005, 41 pages.

Testing, http://msdn.microsoft.com/library/en-us/vsent7/html/vxoriTestingOptimizing.asp?frame=true, downloaded Aug. 4, 2005, 1 page.

Testing, Verification and Measurement—Home, http://research.microsoft.com/tvm/, downloaded Aug. 4, 2005, 4 pages.

Unit Testing, http://msdn.microsoft.com/library/en-us/vsent7/html/vxconunittesting.asp?frame=true, downloaded Aug. 4, 2005, 1 page.

Visual Studio Team System: Visual Studio 2005 Team System Home, http://lab.msdn.microsoft.com/teamsystem/, downloaded Aug. 4, 2005, 4 pages.

Visual Studio 2005 Team System Modeling Strategy and FAQ, http://msdn.microsoft.com/library/en-us/dnvs05/html/vstmodel.asp?frame=true, downloaded Aug. 4, 2005, 11 pages.

Visser et al., "Test Input Generation with Java PathFinder," *Proc. 2004 ACM SIGSOFT International Symposium on Software Testing and Analysis*, 2004, pp. 97-107.

Xie et al., "Symstra: A Framework for Generating Object-Oriented Unit Tests Using Symbolic Execution," *TACAS*, vol. 3440 of *Lecture Notes in Computer Science*, Springer, 2005, pp. 365-381.

Yorsh et al., "A Combination Method for Generating Interpolants," *Twentieth International Conference on Automated Deduction (CADE '05)*, Jul. 2005, 16 pages.

U.S. Appl. No. 11/197,912, filed Aug. 4, 2005, Tillmann et al.

U.S. Appl. No. 11/322,967, filed Dec. 30, 2005, Tillmann et al.

U.S. Appl. No. 11/323,032, filed Dec. 30, 2005, Tillmann et al.

jtest User's Guide, Version 5.1, Parasoft Corporation, Jun. 2004, 251 pages.

Veanes et al., "On-The-Fly Testing of Reactive Systems," Microsoft Research Technical Report MSR-TR-2005-05, Jan. 2005, 16 pages.

Khurshid et al., "Generalized Symbolic Execution for Model Checking and Testing" Proceedings of the 9th International Conference on Tools and Algorithms for Construction and Analysis of Systems (Lecture Notes in Computer Science, vol. 2619), Garavel H, Hatcliff J (eds.), Springer: Berlin, 2003; pp. 553-568.

Roos, "Java data objects" Chapter 8, section 8.1, Pearson Education Ltd., 2003, accessed from Safari Books, 2 pages. (URL http://proquest.safaribooksonline.com/print?xmlid=0321123808/ch08lev1sec1).

Claessen et al., "QuckCheck: A Lightweight Tool for Random Testing of Haskell Programs," Proceedings of the fifth ACM SIG PLAN International Conference on Functional Programming, 2000, pp. 268-279.

* cited by examiner

FIG. 5

```
void TestAdd(
    // parameters
    ArrayList a, object o) {
    // assumptions
      Assume.IsTrue(a!=null);
      // program statements
      int i = a.Count;
      a.Add(o);
      // assertions
      Assert.IsTrue(a[i] == o);
}
```

500

PARAMETERIZED UNIT TESTS WITH BEHAVIORAL PURITY AXIOMS

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Automated software testing or verification is becoming more and more important as software systems continue to grow in size and complexity. The term automated software verification refers to machine-assisted techniques that compare the actual behavior of a software component with its predicted behavior. Verification can occur offline at compile time or it can involve running the program under test. Whether static or dynamic, automated verification always operates with respect to a notion of expected system behavior. Automated software testing allows a test program to check for properties that are specific to the system or implementation under test (IUT).

One such example of a specification as input is known as a unit test. Consider the following code,

```
[TestMethod]
void TestAdd ( ){
    ArrayList a = new ArrayList(0);
    object o = new object( );
    a.Add(o);
    Assert.IsTrue(a[0] == o);
}
```

TestAdd is a unit test that adds an element to an array instance. The test first creates a new array list, where the parameter to the constructor is the initial capacity, then adds a new object to the array list, and finally checks that the addition was correctly performed by verifying that a subsequent index lookup operation returns the new object.

The unit test above includes a test statement (i.e., Assert.IsTrue(a[0]=o) that compares the observed behavior with the expected result. The test is a unit test, because when it is compiled and run, it tests only the behavior of a single unit of the implementation under test.

SUMMARY

A test generation software program receives a parameterized unit test and symbolically executes the parameterized unit test on an implementation under test (IUT). The test generation software program identifies one or more possible execution paths, each of which can be associated with a set of constraints. Test cases are determined automatically that satisfy the constraints of the paths. The test cases can be represented by particular input parameters for the parameterized unit test. The test cases verify behavior of the IUT. Summaries of the behavior of the parameterized unit test can be generated. The summaries can be interpreted as conditional quantified formulas over the IUT, called axioms. Textual indications in the other parameterized unit test can be used to identify methods whose summarized methods should be used. The symbolic execution of the parameterized unit test executes plural program statements and emulates others that are decorated to re-use axioms. A separate heap is used to record invocations of emulated methods. Emulated methods are summarized methods created from a previous symbolic execution of another parameterized unit test.

A system for testing programs includes a parameterized unit test, an implementation under test, a symbolic executor creating a series of constraints while symbolically executing the parameterized unit test of the implementation under test, and a constraint solver that generates a set of test cases by solving for values that satisfy the series of constraints. Further, the parameterized unit test includes input parameters, a series of program statements, and one or more assertions verifying program behavior. The digital memory further includes a heap which includes an intensional and an extensional portion. The extensional portion includes a history of updates of memory locations and the intensional heap includes a collection of invocations of emulated methods. A theorem prover includes logic for interpreting the axioms derived from a parameterized unit test. The symbolic executor uses summarized methods during symbolic execution when a parameterized unit test has been decorated with a textual indication of re-using axioms.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5 is a program listing of an exemplary parameterized unit test.

DETAILED DESCRIPTION

Brief Overview

Figure 1:
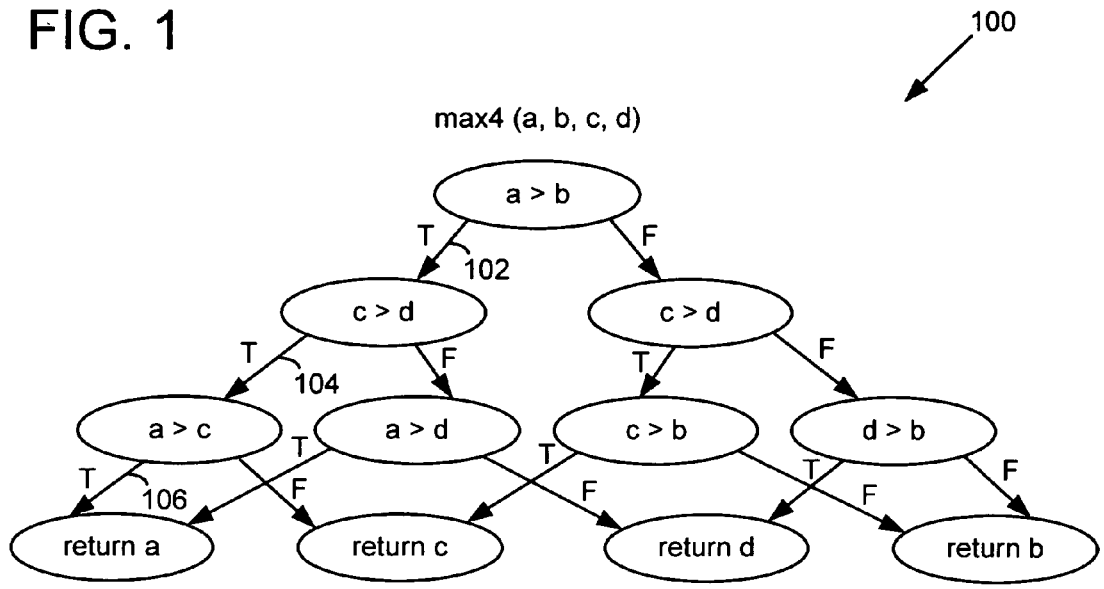
FIG. 1 is a graphical tree representing paths of conditions on symbolic inputs.

Parameterized unit tests extend the current industry practice of closed unit tests. A parameterized unit test is a test with input parameters, a series of program statements, and one or more assertions verifying program behavior. One purpose of a parameterized unit test is to specify the external behavior for various values assigned to the parameters. For example, a specific test can be obtained (e.g., a previous closed unit test can be re-obtained) by instantiating the parameterized unit test with specific input parameters. Separation of parameterized unit tests from specific test cases supports many benefits including automated test case generation. Symbolic execution assigns symbolic input variables to parameters of a parameterized unit test. Possible path constraints of an implementation under test (IUT) are identified during symbolic execution. In one example, a graph is created that identifies constraints that must be satisfied to travel a path through a graph of states of the IUT. A constraint solver automatically generates test cases (e.g., value assignments to the input parameters of the parameterized unit test) by determining the test inputs that satisfy the constraints of an execution path through the IUT. Additionally, symbolic execution is supported for object-oriented programs. The described object-oriented symbolic execution technology allows a parameterized unit test to include an arbitrary number of classes, plural instantiations of each class, and multiple assignments to fields within objects. A path through a graph of constraints determines possible concrete parameter assignments. An automated constraint solver and/or theorem prover automatically selects a minimal set of inputs that exercise possible code paths through an implementation. In addition, parameterized unit tests are used to populate behavioral summaries. Behavioral summaries provide information that can be used to scale automated testing for a selected level of abstraction. A heap is partitioned into intensional and extensional heaps. The intensional heap is provided to represent state changes performed by summarized methods. The extensional heap is used to explicitly update object fields or array elements. The intensional heap is traversed to create axioms that summarize program behavior. The program behavioral summaries are used later in future symbolic executions to emulate behavior so a test program no longer needs to execute instructions of a summarized method.

Exemplary Separation of Test Concerns

As they are conventionally used, unit tests fail to distinguish between two different aspects of testing. Black box testing is based on descriptions of the behavior of a program that a user should be able to exercise, expect, and rely upon. White box testing enumerates the different test cases which exercise corner cases of a specific implementation, for example, based on viewing of the source code. A parameterized unit test may specify in general how any array should perform, whereas a unit test can only specify a particular behavior that is expected from a specific array implementation.

Parameterized unit tests allow separating these two concerns and enable modularized testing in a scalable way. Thus, the described methods enumerate the test cases (White box) when given a parameterized unit test that specifies expected external behavior (Black box). The description of the external behavior is given as a parameterized unit test, and the enumerated test cases are provided by automated instantiations of the parameterized tests. Symbolic execution and constraint solving is used to enumerate the input values that might otherwise be written manually for unit tests.

Exemplary Symbolic Execution

With symbolic executions, instead of using concrete values, operations are performed on symbolic values. Symbolic execution uses symbolic input values, with abstract names, and then builds expressions as a program manipulates the input symbolic values. Thus, expressions such as A+B are used instead of concrete values, such as 4, as can be computed from 1+3.

Whenever the program execution arrives at a point which can only be reached when a certain condition has been met, e.g. after a conditional branch, a condition or constraint is generated that includes symbolic inputs whose precise value does not have to be determined. For example, a condition could be one or more symbolic values in a relationship (e.g., x<4, y+4<z, etc.).

A symbolic state of a program may map variables to expressions which may include symbolic expressions that may contain concrete values such as constants. Thus, variables hold expressions.

For example, if a table of values has columns representing variables, and rows indicate progressing states of a symbolic execution, expressions are assigned to variables for a state. So instead of a concrete value at a variable or field, there is an expression (e.g., a+b) which represents some operation on the inputs or other state in the program. Of course, the table itself is not required for symbolic execution, it is just an example representing how symbolic execution uses symbols to represent execution.

Consider the following functions max and max4,

```
int max (int x, int y)
{
    if x > y return x;
    else return y; }
int max4 (int x, int y, int z, int w)
{   int u = max (x, y);
    int v = max (z, w);
    int t = max (u, v);
    return t; }
```

If the function max4 (x, y, z, w) is called with symbolic variables, a, b, c, and d instead of concrete integer values, then the following Table A represents a symbolic execution.

TABLE A

| | Variables | | | | | | |
|---|---|---|---|---|---|---|---|
| State | x | y | z | w | u | v | t |
| 0 | a | b | c | d | — | — | — |
| 1 | a | b | c | d | a or b | — | — |
| 2 | a | b | c | d | a or b | c or d | — |
| 3 | a | B | c | d | a or b | c or d | a, b, c, or d |

The symbolic execution represents many possible executions for the symbolic inputs a, b, c, and d, thereby representing many instantiations of integer assignments to a, b, c, and d. Symbolic executions may also be represented in other ways, such as a graph, or as a textual description, etc.

FIG. 1 is a tree representing paths of conditions on exemplary symbolic inputs. For example, the above max functions may traverse the conditions of the tree 100 based on concrete integer assignments to input variables x, y, z, and w. Each path down the tree represents a path that might be tested if providing coverage of a program is desired. Gathering the relationships of operations on symbolic inputs provides information useful in creating concrete assignments to x, y, z, and w. For example, inputs are selected that cover the behavior generated by symbolic execution, such as covering paths of a tree to verify program behavior. Thus, by parameterizing unit tests and performing symbolic execution on symbolic values, concrete assignments that explore the behavior of a method can be generated automatically.

Exemplary Symbolic Execution of Object Oriented Programs

In order to support symbolic executions of object oriented programs, various techniques are considered. Consider the following code,

```
void min(int z, int r)
    int x;
    int y;
        ...     }
```

The variables z, r, x, and y are identifiable, and can be traced as the 'min' method executes. However, this is not so straightforward when objects are considered. Consider the following code,

```
Class C {
    int f;
}
    void compare (C x, C y, int z, int w) {
        int u = 5        // state = 1
        x.f = z          // state = 2
        y.f = w          // state = 3
        if(x.f == 10)    //state = 4
    ... }
```

If the method 'compare' is called with symbolic values, such as compare (a, b, c, d), then Table B provides one example representation of a symbolic execution.

TABLE B

| | Variables | | | |
|---|---|---|---|---|
| State | u | z | w | Fields |
| 0 | — | c | d | { } |
| 1 | 5 | c | d | { } |
| 2 | 5 | c | d | update ({ }, a, f, c) |
| 3 | 5 | c | d | update (update ({ }, a, f, c), b, f, d) |

As shown in Table B, input symbols c and d are assigned to input parameters z and w, whereas objects and their associated fields are symbolically noted with a fields column. For example, the object fields section represents a map of objects and the object's associated field assignments. Thus, the fields column contains symbolic information that can be used to track and create concrete assignments to an arbitrary number of different objects, and to the various and arbitrary assignments that may occur to their associated possibly multiple fields. In this example, an update function contains four parameters. The first parameter is the state of the fields (e.g., heap) before the present update. Here, " " is used to represent the initial heap in which no field has been updated yet. Other initial heaps are possible. The second parameter of the update function is the identifier of a symbolic instantiation 'a' of the class C. The third parameter is the field in 'a' to update, and the fourth parameter contains the symbolic value 'c' that is assigned to field a.f. Conditions can involve a particular state of the fields, e.g. the condition of the if-statement in the above program can be represented by the following expression:

select(update(update({ },a,f,c)b,f,d),a,f)==10

From these symbolic values relationships, concrete value can be automatically generated (via a constraint solver and/or theorem prover) that will explore various paths of a tree representing possible Executions.

Figure 2:
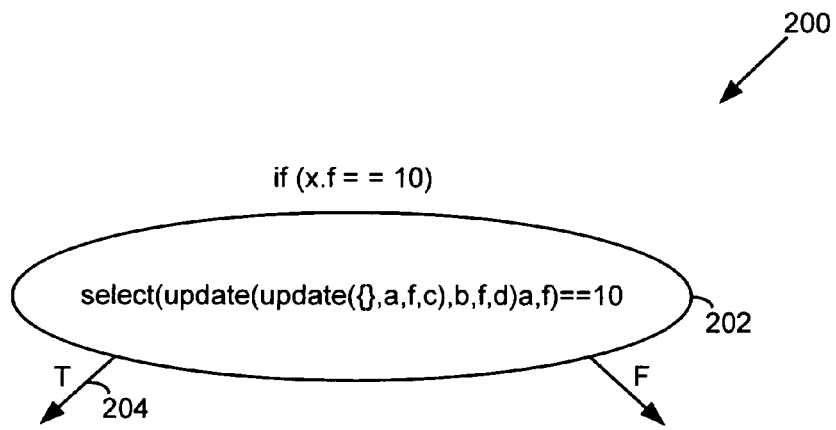
FIG. 2 is a graphical tree representing paths of conditions of a symbolic execution.

FIG. 2 is a tree representing exemplary paths of conditions of a symbolic execution. For example, a select function obtains a symbolic value at field f of symbolic object 'a' and compares it to constant value '10'. Thus, coverage of this tree is provided by assigning concrete values such that a.f is equal to and not equal to '10' after state 3 of Table B. It is interesting to note that Table B and FIG. 2 represent possibly all calls that can be made on the 'compare' method. For example, even if a and b are the same object, the fields update column of Table B, and the comparison 202 in the tree 200 represent the behavior. Thus, the information is saved in a general way that can be used to generate concrete inputs for coverage, where 'compare' is called with inputs that cover paths of the tree 200, in cases where objects 'a' and 'd' are the same or different, and in cases where variables 'c' and 'd' are the same or different. Test case generation is identifying input values that solve the constraints that exist along one path of a graph (e.g., FIG. 1, 102, 104, 106, or FIG. 2, 204). Often it is desirable to provide a minimum or reduced number of inputs to cover paths of a graph. However, full coverage is not always required, as automated testing of even partial coverage is often valuable. In some cases, a set of candidate values are provided by a user to provide coverage, as discussed in section 2.4. A constraint solver is typically able to solve paths of constraints to provide input values, once the constraint solver is provided the path constraint information developed during symbolic execution.

Exemplary Partitioning of a Heap

Previously, an extensional heap was represented as a nested application of update functions (e.g., Table B). A second heap is provided as a collection of invocations of summarized methods, such as the behavioral summaries or axioms described in section 3.4 below. Thus, a separation of heaps, logical or otherwise, provides a useful design for indicating which objects or methods should be executed to derive field updates, and which objects or methods should be emulated with summaries.

A heap may describe the state of objects, often many or all objects. In one example, a heap describes the state of object fields by a mapping, which can be represented as nested applications of update functions. In one example, these nested functions are located in an extensional heap.

An intensional heap is a collection of summarized method invocations. Methods may be summarized by axioms, or axiom formulas, which describe method relationships. For example, a summary (e.g., axiom formula) may be derived from parsing a parameterized unit test as described in section 3.4.

Consider the following code,

```
class C {
    int f;
}
void m (C c, Arraylist a) {
    c.f = 5;         // state 1
    a.Add (...);         state 2
    a.Add (         // state 3
```

Table C provides a possible evolution of heaps divided into separate parts, such as an extensional heap with field updates and an intensional heap of method summaries.

TABLE C

| State | Extensional | Intensional |
|---|---|---|
| 1 | update (X, c, f, 5) | — |
| 2 | — | Adds (Y, a, . . . ) |
| 3 | — | $Add_s (Add_s (Y, a, \ldots ), a, \ldots )$ |

Suppose that it is desirable to examine the operation of the method 'm' in detail in order to exercise each possible execution path of 'm'. Further, suppose that so long as the paths of 'm' are covered, a given test is willing to rely on summaries of the behavior of the Arraylist a, without requiring path coverage of the methods of 'a'. In that case, a parameterized unit test may be decorated with an attribute (e.g., "Using Axioms" of) indicating to use the summaries of behavior already developed for Arraylist objects. If the summaries of the Arraylist have been created and are available to the intensional heap, then they can be used to emulate behavior in calls to methods of 'a'. Optionally, if they are not available for or in an intensional heap, the summaries can be created here, saved for future use, and used as required here to support coverage of the extensional heap.

Thus, instead of executing the statements of the a.Add( ) method in Table C, at state 2, the test generation software program may determine that a summary is available, and instead provides a resulting behavior according to the summarized behavior for the Arraylist. The software program remembers (e.g., via a heap or other data structure) that the a.Add( ) method was called using an expression such as $Add_s(X, a, \ldots)$, where in Table C "X" and "Y" are placeholders for an initial heap state. When the Add method is called again, the test program remembers with a nested expression such as $Add_s (Add_s(X, a, \ldots), a, \ldots)$ that a call summary is available to the intensional heap. The subscript S on the $Add_s( )$ function indicates the state change caused by calling the Add function. Thus, the nested function applications (e.g., $Add_s(Add_s(X, \ldots) \ldots))$ represent a history of method calls, while the nested function applications on the extensional heap represent the history of the updates on the fields of one more many objects. Thus, the intensional heap is more abstract, since it summarizes method calls on an object, while the extensional heap examines what happens to the fields within an object. The extensional heap sees what happens to fields in an object, whereas the intensional heap sees methods called on the object without seeing whether or what fields the method affects within the object.

These various levels of abstractions are used for example when it is desirable to test one part of a system explicitly and test another part of the system only implicitly. For example, if the Arraylist is already tested and/or trusted, then a parameterized unit test that directly or indirectly utilizes an Arraylist as a resource can be decorated with an attribute indicating to use axioms of the ArrayList. For example, the Add( ) method of Arraylist has a case split requiring different tests that take into account an Arraylist overflow and resizing of the maximum Array length. If the test exploration covers many paths through Arraylist, then this results in unnecessary coverage of Arraylist behavior. Instead, the behavior of Arraylist is explored only as needed to complete coverage of the objects in the extensional heap. Thus, the summaries created from the parameterized unit tests of the Arraylist are used to return the behavior of the method calls directed to the intensional heap with a "Using Axioms" attribute. For example, section 3.4 provides a universally quantified formula for the 'TestAdd'. Another example is provided in section 2.5, where a TestClass of a BagTest uses axioms from a HashTable test.

Another possible benefit of the intensional heap is when the test program has no access to certain information. For example, if an accessed resource is on a lower machine level (e.g., binary machine code), then often the test program is unable to access details about the resource that would allow determination of resource coverage. Thus, if an object cannot be examined internally, axioms are used to provide expected behavior.

The intensional heap supports reusing summarized methods. When symbolic execution encounters a method indicated for "Using Axioms," the summarized method calls are emulated from a set of method summaries. Thus, the intensional heap helps scale symbolic execution by emulating various indicated methods.

Exemplary Generating Axioms From Parameterized Unit Tests

Axiom formulas are generated from parameterized unit tests for summarized methods. The formulas are symbolic summaries of the methods, and if desirable, are generated by a variation of symbolic execution. As the statements of a parameterized unit test are executed symbolically, the constraints and assumptions are saved as path conditions. The performed operations may be recorded in heaps. For each assertion in the parameterized unit test, an axiom formula is generated that states that the assertion condition must hold under the aggregated path condition at the time of the assertion. If an expected exception type is indicated, e.g. by a textual indication, an axiom formula is generated that states that an exception compatible with the expected exception type is thrown within the parameterized unit test. If no expected exception type is indicated, an axiom formula is generated that states that no uncaught exception is thrown within the parameterized unit test. If behavioral purity is indicated, e.g. by a textual indication, an axiom formula is generated that states that the intensional heap before and after the execution of the parameterized unit tests are equal. A specific example of generating an axiom from a parameterized unit test is described below in section 3.4.

Reusing Axioms for Symbolic Execution

While symbolic execution is more general than concrete execution, it is also generally more resource intensive. The number of possible paths can grow exponentially with the number of control flow decisions.

Instead, certain methods are decorated with a "Using Axioms" attribute. This attribute indicates that behavioral summaries (e.g., axioms) are to be used for the decorated methods.

In one example, the methods decorated with a textual indication for using summaries are supported in a subsequent symbolic execution by a set of summaries generated from a previously automated generation of axioms. For example, if the summarized methods were mentioned in a series of calls previously made e.g. on an object during a symbolic execution of a parameterized unit test of the object, then the summaries will already be available to the test program. Optionally, a user can write axioms for these summarized methods if they can't be symbolically executed for any reason. For example, if the method is from a binary file and no source code or reflection capabilities are available for the methods, the user can write axioms for summarized methods.

A theorem prover may be given axioms describing the behavior of summarized methods. These axioms may have been generated from parameterized unit tests by means of a variation of symbolic execution. Finally, further symbolic execution may emulate methods for which summaries exist. A textual indication (e.g., "Using Axioms") may be given to cause the emulation of summarized methods. Although the above concepts are each patent-ably distinct on their own merits, it is interesting to see them used together in a combination as follows.

Figure 3:
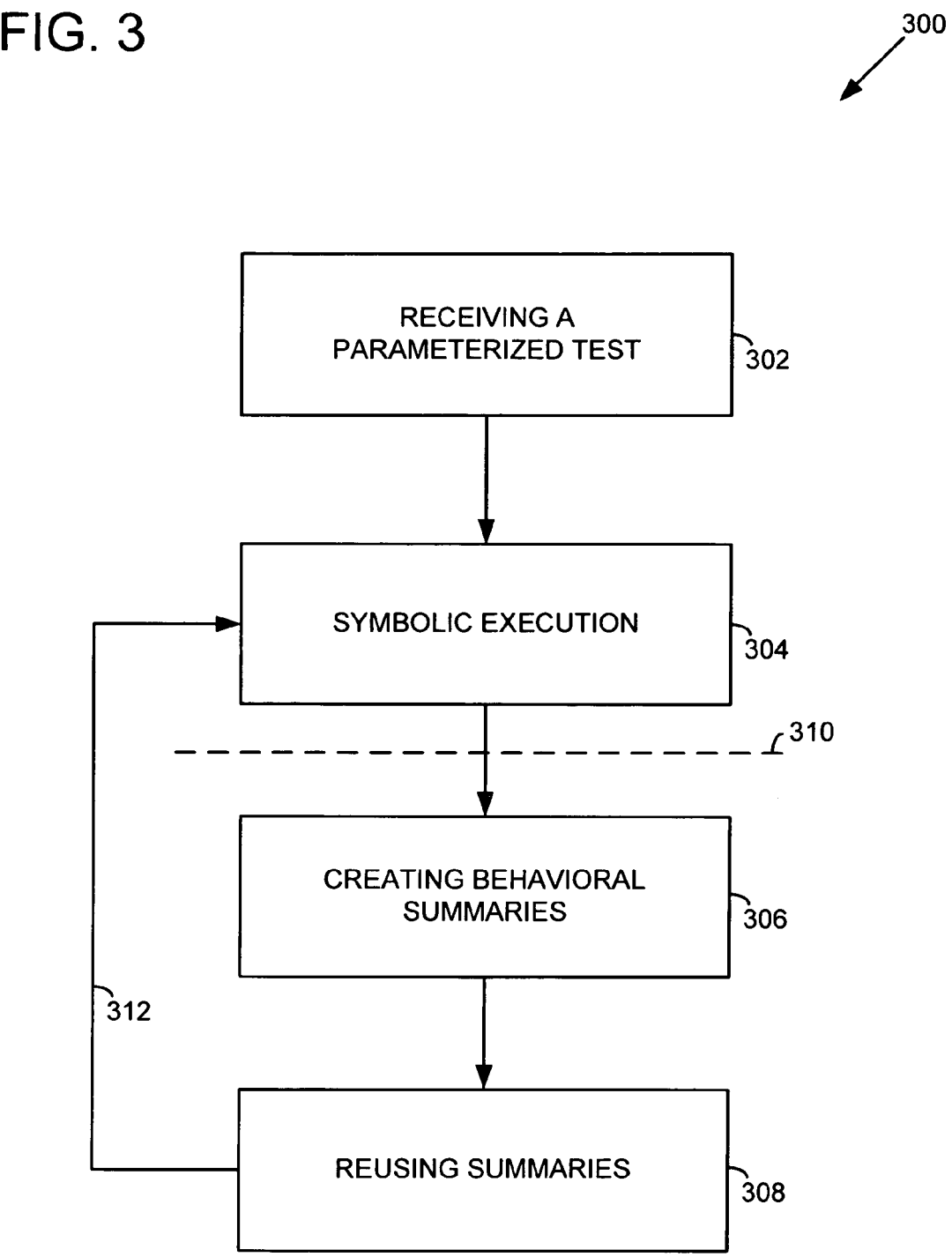
FIG. 3 is a flowchart of an exemplary method of reusing axioms for symbolic execution.

FIG. 3 is a flowchart of an exemplary method of reusing axioms for symbolic execution. For example, one or more components of a computer program, such as a software testing program, could perform the following method.

At 302, the method receives a parameterized unit test.

At 304, the method symbolically executes the parameterized unit test of an implementation under test to identify one or more possible execution paths, each described by a set of constraints. During or subsequent to symbolic execution, a set of test cases are generated automatically based on constraints identified via symbolic execution. Optionally, the parameterized unit test includes program statements that require the symbolic execution of objects and associated field observations and changes. If so, at step 304, an arbitrary number of (1) object classes, (2) instantiations of objects of a class, (3) and/or assignments to plural fields per object are supported using a series of nested updates that include a history of the heap, a symbolic object presently being updated, a field of the symbolic object being updated, and a value (e.g., a symbolic value) updating that field. Without going further 310, automated test case generation using a parameterized unit test as input, is a valuable contribution to the computing arts. However, further benefits are also obtained.

At 306, the method creates axioms summarizing the behavior of methods in the parameterized unit test.

At 308, the method re-uses the summaries created at 306. For example, the method receives a parameterized unit test 302 that includes a method textually decorated to reuse axioms created above at step 306. The method re-uses 312 the previously created summaries in a symbolic execution 304. Further, the method symbolically executes the parameterized unit test with indicated summarized methods, thereby symbolically executing some statements and emulating other method calls decorated for re-use axioms.

Exemplary System for Testing Programs

Figure 4:
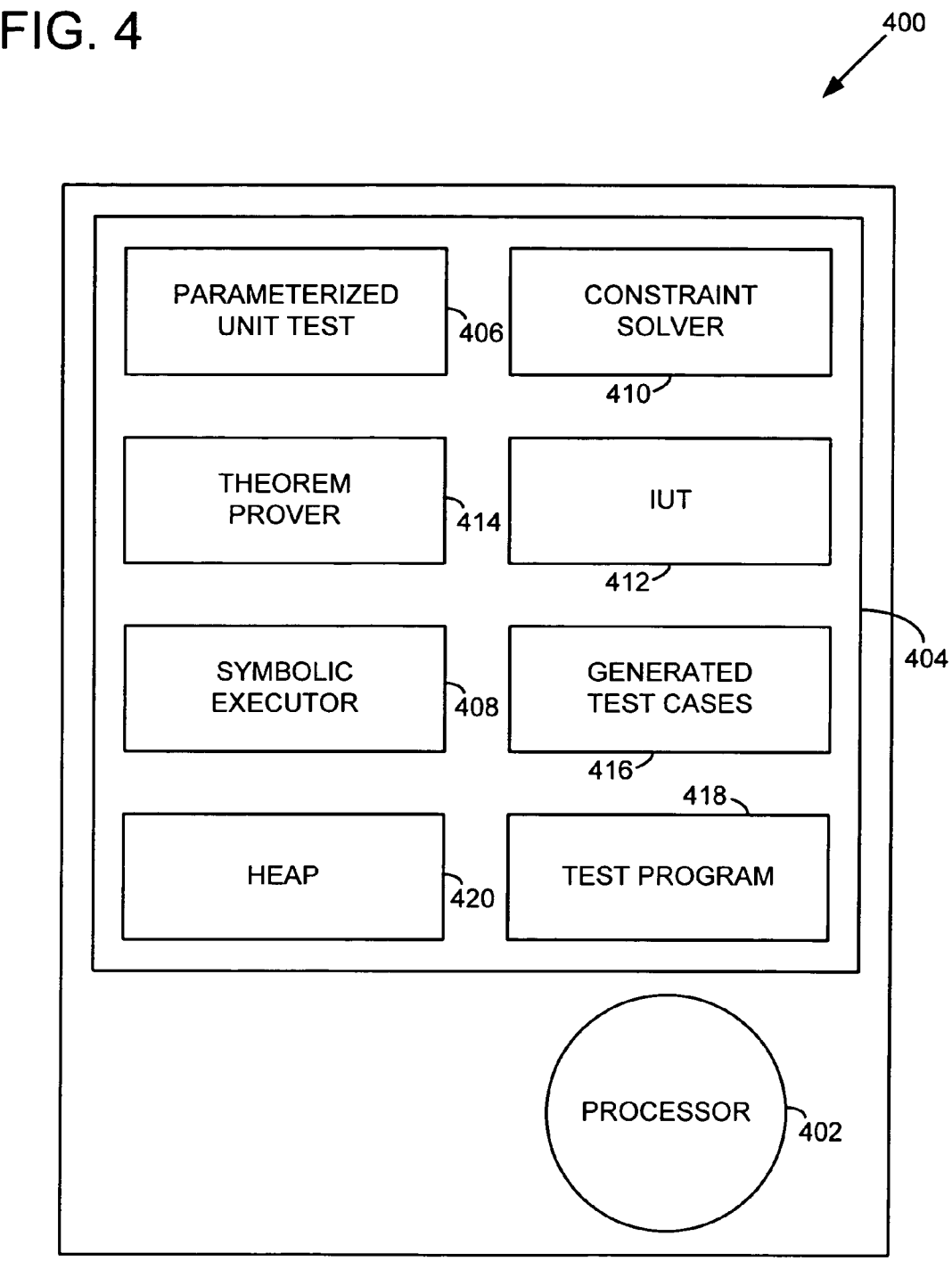
FIG. 4 is a block diagram of an exemplary system for testing programs.

FIG. 4 is a block diagram of an exemplary system for testing programs. The system 400 comprises a digital processor 402, digital memory 404, a test program in memory 418, and several other computer readable resources including a parameterized unit test 406, a constraint solver 410, a theorem prover 414, an implementation under test (IUT) 412, a symbolic executor 408, generated test cases 416, and a heap 420 (which may include an intensional and extensional portion). The test program directs an automated test case generation using various other components such as the described resources (406-416, 420). A parameterized unit test 406 is a test with input parameters, a series of program statements, and one or more assertions verifying program behavior. A theorem prover 414 is populated with a background of summarized methods. A theorem prover 414 and/or the symbolic executor 408, generate universally quantified formulas from a parameterized unit test such as summarized methods. These formulas can then be used by the theorem prover 414 to reason about the externally observable method behavior without requiring execution of the methods from which the summaries arise. A symbolic executor 408 is modified so that it symbolically executes the parameterized unit test in general, but uses summarized methods during symbolic execution when a parameterized unit test decorates a method with a textual indication "using summaries", or other such indications. The constraint solver 410 examines a set of constraints created during symbolic execution, and derives a set of test cases providing coverage for the set of constraints. The test program 418 executes the automatically generated test cases 416. The heap 420 stores various information such as information about the symbolic execution. The heap may include an intensional portion and an extensional portion. Optionally, the parameterized unit test 406 includes program statements that require the symbolic execution of objects and associated fields. If so, an arbitrary number of (1) object classes, (2) instantiations of objects of a class, (3) and/or assignments to plural fields per object are supported using a series of nested updates that include a history of the heap, a symbolic object presently being updated, a field of the symbolic object being updated, and a value (e.g., a symbolic value) updating that field. Typically, the history of updates on a symbolic object are stored on the extensional heap.

Exemplary Formalistic Approach

The following exemplary sections 1-5 provide a formalistic discussion of various features of the described technologies.

Section 1

Introduction

Object-oriented parameterized unit tests are programs which contain test classes which contain parameterized unit test methods. Conventional (i.e. non-parameterized) unit test methods typically execute a method of a class with fixed arguments and then verify the predicted answer. (Non-parameterized) unit test tools fail to provide any guidance for:

which tests should be written (for internal and for external behavior), how to come up with a minimal number of test cases, and what guarantees the test cases provide.

Parameterized unit testing provides an extension to the current industry practice of closed unit tests. Parameterized unit tests consist of two parts. First, closed unit tests are replaced by parameterized test methods embodying the test oracle (e.g., an assert statement condition). One purpose of a parameterized unit test method with parameters is to specify the external behavior for various (possibly all) possible method parameter assignments. Parameterized test methods thus serve as block box specifications for the class under test. Second, traditional closed unit tests are regained by instantiating the parameterized methods. Instantiations should be chosen so that they exercise different code paths of the class under test. Selecting inputs to exercise code paths resembles white box testing.

This separation of concerns between external specification and internal test cases has many advantages. It can be exploited by using symbolic execution and constraint solving to automatically choose a minimal set of inputs that exercise the parameterized unit test with respect to possible code paths of the implementation. If the algorithms under test have only finitely many paths and if the parameterized unit test passes for the algorithmically chosen inputs, the parameterized unit test would pass for all inputs. Even if these all conditions can't be satisfied, an unbiased set of test cases with high code coverage is still typically obtained. Another benefit is that parameterized unit tests can be used as summaries of the external behavior of the tested code. Thus when it is desirable to test a class A that depends on a class B, a symbolic evaluation doesn't have to run the code for B. Instead, the symbolic evaluation can use B's parameterized unit tests as rewrite rules for solving the generated constraints. This guarantees faster generation of fewer test cases with the same coverage for A.

Parameterized unit tests (PUTS) make various contributions to software testing. Several examples of the provided benefits are as follows:

- allowing unit tests to play a greater role as black box specifications of program behavior,
- reducing the number of unit tests that must be written by automating case analysis,
- often providing path coverage, which amounts to a formal proof, and
- scaling to large systems by reusing behavioral summaries of parameterized unit tests to control the intrinsic path explosion problem of traditional symbolic evaluation. Section 2 illustrates the advantages of parameterized unit tests on some small examples. Section 3 discusses the formal framework and sketches one implementation. Section 4 discusses exemplary results.

Section 2

Overview 2.1 Traditional Unit Tests

Existing closed unit tests are self-contained programs that test program behavior. Implemented as a method with no parameters, each unit test explores a particular aspect of the behavior. An attribute such as [TestMethod] indicates that a method represents a unit test.

```
[TestMethod]
void TestAdd( ) {
    ArrayList a = new ArrayList(0);
    object o = new object( );
    a.Add(o);
    Assert.IsTrue(a[0] == o);
}
```

The above closed unit creates a new array list, where the parameter to the constructor is the initial capacity, then adds a new object to the array list, and finally checks that the addition was correctly performed by verifying that a subsequent index lookup operation returns the new object. Visibility modifiers are omitted in all code fragments.

It is important to note that closed unit tests include a test oracle that verifies the observed behavior with the expected result. By convention, the test oracle of a unit test is encoded using debug assertions. The test fails if any assertion fails or an exception is thrown.

2.2 Parameterized Unit Tests

The unit test given above specifies the behavior of the array list by example. Strictly speaking, this unit test only says that adding a particular object to an empty array list results in a list whose first element is this particular object. However, the above closed unit test says nothing about other array lists or other objects being added to the array list. Consider the following code,

```
[TestAxiom]
void TestAdd(ArrayList a, object o) {
    Assume.IsTrue(a!=null);
    int i = a.Count;
    a.Add(o);
    Assert.IsTrue(a[i] == o);
}
```

By adding parameters (e.g., "ArrayList a, object o"), a closed unit test case is transformed into a universally quantified conditional axiom that must hold for all inputs under specified assumptions. Intuitively, the TestAdd( ) method asserts that for all array lists a and all objects o, the following holds:

$$\forall \text{ArrayList } a, \text{object } o. \\ (a \neq \text{null}) \rightarrow \text{let } i = a.\text{Count in } a.\text{Add}(o); a[i] == o$$

where the $Add_s$ method denotes the effect of the Add method on the receiver state. From left to right, the axiom reads as—if a is not equal to null, then set i equal to the count of the array list, add o to the array list, look up the object at array index i and it should be equal to o. Section 3.4 explains how axiom formulas are derived from parameterized unit tests in more detail.

FIG. 5 shows a program listing 500 of an exemplary parameterized unit test. In the example, the parameters, assumptions, program statements (e.g., method sequence), and assertions are labeled with comments.

2.3 Test Cases

Adding parameters to a unit test improves its expressiveness as a specification of intended behavior, but alone it provides no concrete test cases. The parameterized unit test can not be executed by itself because it needs actual parameters (e.g., concrete parameters). A method is provided for obtaining actual parameters, such as test cases that provide sufficient and/or comprehensive testing.

In the ArrayList example, if the internal structure of a NET array list implementation is observed, there are two cases of interest. One occurs when adding an element to an array list that already has enough room for the new element (i.e. the array list's capacity is greater than the current number of elements in the array list). The other occurs when the internal capacity of the array list must be increased before adding the element.

If it is assumed that the library methods invoked by the ArrayList implementation are themselves correctly implemented, it can be determined by deduction, that running exactly two test cases is sufficient to guarantee that TestAdd( . . . ) succeeds for all array lists and all objects. The two test cases are as follows,

```
[TestMethod]
void TestAddNoOverflow( ) {
    TestAdd(new ArrayList(1), new object( ));
}
[TestMethod]
void TestAddWithOverflow( ) {
    TestAdd(new ArrayList(0), new object( ));
}
```

Splitting axioms (e.g., parameterized unit tests) and test cases (e.g., test methods with values assigned to the input parameters) in this way is a separation of concerns. First, expected behavior is described as parameterized unit tests (PUTS). Then the test case distinctions are generated by the code paths of the implementation to determine which inputs make sense for testing.

2.4 Test Case Generation

Symbolic execution is used to automatically and systematically produce the minimal set of parameter instantiations needed to execute a finite number of paths. Symbolic execution works as follows: For each formal parameter a symbolic variable is introduced. When arguments, local variables, or fields are updated to a new value in the course of the program execution, then this new value is often expressed in terms of the symbolic argument variables. As symbolic execution explores "each" possible execution path, it builds for each path a path condition which is always expressed in terms of the symbolic argument variables. For example, the Add-method of the ArrayList implementation contains an if-statement condition of "this.items.Length==this.size" (where the field items denotes the array holding the array list's elements and the size denotes the number of elements currently contained in the array list). Symbolic execution adds this condition to the path condition (PC) for the then-path and the negated condition to the path condition of the else-path. By doing so, all constraints are collected that are needed to deduce what inputs cause each code path to be taken.

Analysis of all paths can't always be achieved in practice. When loops and recursion are present, an unbounded number of code paths may exist. In such a case, behavior may be approximated by analyzing loops and recursion up to a specified number of unfoldings. Even when there are a finite number of paths, solving the resulting system of constraints is sometimes computationally infeasible. The ability of the constraint solver and/or theorem prover to generate inputs (e.g., automated generation of test cases) based on path analysis depends upon the abilities of various known constraint solvers such as Zap or Simplify. After collecting constraints for each code path, an automated solver reduces the constraints collected in the previous step into concrete test cases. This cannot always be done automatically.

So, if desirable, the programmer (e.g., testor) will supply additional inputs. For example, when constructing suitable ArrayList values, an array capacity and array content elements can be input (e.g., keyboarded) by the test operator. For example, the user can input a textual indication such as "Test Values" shown below. Another way of indicating desired test behavior is via an "Invariant" textual indication shown below. A user may provide a set of candidate values for the formal parameters. Assume that a user has provided the following values,

```
[TestValues(For="TestAdd", Parameter="a")]
    ArrayList[ ] a = {new ArrayList(0),
    new ArrayList(1)};
[TestValues(For="TestAdd", Parameter="o")]
    object[ ] o = {new object( )};
```

With these input values, the constraint solver can simply choose a[0], a[1] and o[0] as representatives that fulfill the constraint. The generated tests are:

```
TestAdd(a[0], o[0]);
TestAdd(a[1], o[0]);
```

The second way to enable parameter generation is for a programmer to provide an invariant for a class that makes it possible to construct a suitable value using a reflection method (e.g., .NET Reflection, Java Reflection, etc.). The invariant is a Boolean predicate with the attribute [Invariant] attached to it. For array lists, a user provided invariant is illustrated as follows,

```
[Invariant]
this._items != null && this._size>=0 &&
this._items.Length >= this._size
```

For the TestAdd( ) method, this invariant is instantiated with the symbolic variable "a" and serves as the initial path condition (e.g., Assume). This allows the constraint solver to give consistent example input values for each symbolic variable encountered on each path. For the path with the condition a.items.Length==a.size, the solver could choose the binding: a.items.Length==0 and a.size==0. Using reflection the system can now produce an array list that corresponds exactly to a[0].

In case the constraint solver can not find any solution it will print the feasible path. If a theorem prover and/or constraint solver is unable to find concrete values that exercise a path of constraints, then optionally, the feasible path is provided to the test program user. Optionally, the user can provide candidate representatives that will exercise the path. In another example, the test program user can provide candidate representatives and/or an invariant. These various methods can be used together or separately, identifying problems to overcome, and to build up conditions that prepare or allow the automation to continue.

2.5 Reusing Parameterized Tests

While symbolic execution is more general than concrete execution, it is also slower. The number of possible paths to consider can grow exponentially with the number of control flow decisions. A method is provided to prune the search space.

Consider the following example of a bag class. A bag is an unordered collection of values. Elements may appear more than once in a bag. The following bag class is an exemplary implementation under test (IUT). In the case, the bag class is implemented by using a hash table in which an element and its multiplicity are stored as key-value pairs.

```
class Bag {
    Hashtable h = new Hashtable( );
    void Add(object o) {
        if (h.ContainsKey(o)) h[o] = (int)h[o] + 1;
        else h[o] = 1;
    }
    int Multiplicity(object o) {
        if (h.ContainsKey(o)) return (int)h[o];
        else return 0;
    }
}
```

A parameterized unit test for the bag class might include an Assert statement that verifies that the Add(x) statement increases x's multiplicity. This may be specified as follows:

```
[TestAxiom]
void AddMultiplicityTest(Bag b, object x) {
    Assume.IsTrue(b!=null & x!=null);
    int m = b.Multiplicity(x);
    b.Add(x);
    Assert.IsTrue(m+1 == b.Multiplicity(x));
}
```

When this parameterized unit test (e.g., with parameters (Bag b, object x)) is symbolically executed the algorithm tries to not only explore all possible paths of the bag but also those of the underlying hash table. The hash table implementation may make many case distinctions (whether an overflow is reached, whether a hash collision must be handled, etc.), and as a result there may be dozens of distinct code paths. Whether or not the hash table has been tested before, testing is redundant at the bag level. In other words, the bag class will be tested redundantly in order to cause coverage of the paths that reach into (e.g., depend on) the hash table. On the other hand, if axioms (e.g., behavioral summaries) that were developed for the parameterized unit testing of the hash table are re-used, then the bag test may require only two test paths as described below in section 4. This takes less time and still provides the same coverage for the bag implementation.

Again, attributes are used to indicate that certain axioms should be reused. The following code illustrates how it could be indicated that axioms should be reused that were defined in another test class.

```
[TestClass, UsingAxioms(typeof(HashtableTests))]
class BagTests {
    [TestAxiom]
    void AddMultiplicityTest( ... ) { ... }
    ...
}
```

Two exemplary axioms for the hash table are given below that relate the constructor, the ContainsKey and the indexer. The attribute ProvidingAxioms is used for the test class, to indicate which type is axiomatized.

```
[TestClass, ProvidingAxioms(typeof(Hashtable))]
class HashtableTests {
    [TestAxiom]
    void NothingContainedInitially(object key) {
        Assume.IsTrue(key!=null);
        Hashtable h = new Hashtable( );
        Assert.IsTrue(!h.ContainsKey(key));
    }
    [TestAxiom]
    void SetImpliesContainsAndGet(
        Hashtable h, object key, object val) {
        Assume.IsTrue(h!=null && key!=null);
        h[key] = val;
        Assert.IsTrue(h.ContainsKey(key));
        Assert.IsTrue(h[key] == val);
    }
    ...
}
```

Using universally quantified axioms in the context of symbolic exploration solves another problem, too. Often parts of a program might not yet be implemented, and sometimes the implementation cannot be interpreted by the symbolic execution engine, such as when reflection is not available, when only binaries are available, and/or when source code is not available. When the code cannot be explored or interpreted, a symbolic description of its behavior may be provided instead. In one such example, the expected behavior is described by parameterized unit tests. For example, axioms were used during the generation of test cases for the ArrayList class. For example, the ArrayList class tested uses arrays which may not be handled by the symbolic execution engine core, so that axioms are needed.

Section 3

Framework

Next, notions introduced informally in the previous sections are formalized. First, the symbolic states and associated constraints are described. Then, the axioms are derived from the parameterized unit tests and the axioms are consumed in subsequent iterations.

One implementation provides a backtrackable interpreter (e.g., a symbolic executor) for intermediate instruction language (e.g., .NET's CIL) and a theorem prover, such as Simplify or Zap. The interpreter works on three address instructions which are directly derived from CIL. The interpreter is optimized to deal efficiently with concrete and symbolic data representations. The theorem provers are used for reasoning about the feasibility of constraints and to find concrete solutions.

3.1 Symbolic State

Symbolic states are like concrete states on which the normal execution operates, except that symbolic states can contain expressions with symbolic variables.

Symbolic Expressions

Let ObjectId be an infinite set of potential object identifiers, VarId be a set of variable identifiers, TypeId be a set of type identifiers, and FuncId be a set of function symbols, such that these sets are mutually disjoint. The set of untyped symbolic expressions E is then described by the following grammar where the meta-variables o, v, t and f range over ObjectId, VarId, TypeId and FuncId, respectively.

$$
\begin{array}{rll}
E = & o & \text{object } ids \\
| & v & \text{variables} \\
| & t & \text{types} \\
| & f(\overline{E}) & \text{function application} \\
| & \forall \overline{v} \cdot E & \text{universal quantification}
\end{array}
$$

Vector notation $\overline{x}$ is used to denote lists of items $x_1 \ldots x_n$.

An expression is defined as a ground expression if it does not contain free variables.

Function Symbols

Two classes of function symbols are distinguished:

Predefined function symbols have a fixed interpretation in the theorem provers used. For instance, add denotes integer addition, div denotes integer division, and denotes logical conjunction; equals(x, y) establishes whether x and y represent the same value or object, and subtype(x, y) establishes that x is a subtype of y. Predefined literals like null, void, 0, 1, 2 are considered to be nullary functions.

Also supported are storage function symbols operating on maps. A map is an extensionally defined finite partial function. Maps support three functions: empty denotes the empty map; update(m, x, v) denotes the update of map m at index x to the new value v; select(m, x) selects the value of map m at index x.

Some of these functions are partial. Their application will typically be guarded by constraints imposed on the state, as will be described in Section 3.2.

In the following, x=y means equals(x, y), and x∧y means and (x, y), and "()" is omitted for functions with empty tuples.

Uninterpreted function symbols represent properties of objects and method calls appearing in axioms.

For example, type(x) denotes the runtime type of object x, and len(x) denotes the length of array x. field$_f$(x) represents the address of field f of object x. elem(x, y) represents the address of the array element at index y of array x. Expressions representing addresses of object fields and array elements are used as indices in applications of storage functions.

For each method m of the program with n parameters (including the this parameter for instance methods) three uninterpreted function symbols are used to summarize different dynamic aspects of m: $m_s$, $m_x$, and $m_r$. Each of these functions takes n+1 parameters, where the additional first parameter represents the state of the heap just before an invocation to m. Let h be an expression denoting the state of the heap in which m($\bar{x}$) is called. Then $m_s(h, \bar{x})$ denotes the resulting state of the heap, $m_r(h, \bar{x})$ denotes the return value of the call, if any, and $m_x(h, \bar{x})$ represents the type of an exception that m throws, or void if no exception can be thrown.

Heaps

Two kinds of heaps are distinguished:

The extensional heap is represented by nested applications of the update function, indexed by field and array element addresses only. empty denotes the initial extensional heap. For example, the execution of the code fragment p.x=1; q.y=2;

turns a given extensional heap $H_e$ into the following extensional heap $H'_e$, assuming the locations p, q hold the expressions t, u respectively, and t and u cannot evaluate to null.

$H'_e$=update(update($H_e$,field$_x$,1),$u$,field$_y$,2)

If an extensional heap expression contains symbolic variables, then the expression actually describes many concrete heaps, possibly isomorphic.

The intensional heap is described by a history of method invocations: initial denotes the initial intensional heap, which represents the state where no method has been called yet. $m_s(H_i, \bar{x})$ represents the sequence of method calls encoded in the intensional heap expression $H_i$, followed by a call to m($\bar{x}$). Consider for example the execution of the following code fragment.

ArrayList a=new ArrayList( );a.Add(o);

This code fragment turns a given intensional heap $H_i$ into $H'_i$, where a is a fresh object identifier, and t the expression held in location o.

$H'_i$=Add$_s$(ArrayList$_s$($H_i$,a),a,t)

Note that constructors typically do not create new objects, but are often seen as methods that are called on fresh object identifiers.

Usually, the types (and its methods) of an IUT are partitioned to work on either heap. If explicit symbolic execution is desired on a type then it is allocated to the extensional heap, whereas, if execution of summaries of type is desired, it is allocated to the intensional heap.

Symbolic State

A symbolic state is a 5-tuple S=(O, A, $H_e$, $H_i$, X), where the current set of objects O is a subset of ObjectId, the program stack A is a stack of activation records, $H_e$ and $H_i$ are expressions denoting the extensional heap and the intensional heap respectively, and finally, X, an object expression, denotes the current exception. Associated with each activation record is a program method, possibly a parameterized unit test (PUT), a program counter pointing to the current instruction to execute in the program method, as well as a store for the formal parameters and local variables. A computation in state S is deemed normal if X is null, and a computation is abrupted if X denotes an exception object. O(S), $H_e$(S), etc. denote projections on S. $S^{+1}$ denotes the state which is like S except that the program counter has been incremented. The set of all symbolic states is called State.

3.2 Constraints

A constraint on a symbolic state is a pair C=(BG, PC), where BG is the static background, which only depends on the program declarations, and PC is the dynamic path condition, which is built up during symbolic evaluation.

The background conjoins subtype predicates, encoding the type hierarchy, and axioms, whose generation is described in Section 3.4. Assume the whole program consists only of the class definition class C { }, then the background would just consist of the single predicate subtype(C, System.Object), indicating that C is a subtype of the base object type, System.Object.

BG(C) and PC(C) denotes projections on C, and we write (BG, PC)∧c for (BG, PC∧c). The set of all constraints is called Constraints.

A constrained state is a pair (S, C).

Let D be a non-empty set, $I_0$ an interpretation of (S, C) that maps every n-ary function symbol appearing in S or C to an n-ary function over $D^n \rightarrow D$, and σ denote an assignment of the free variables appearing in (S, C) to elements in D. I denotes the function which maps symbolic expressions with free variables to values in D.

An interpretation I of symbolic expressions appearing in (S, C) to ground expressions is called a solution of (S, C) if I is a model for BG⇒PC. If a solution for (S, C) exists, then (S, C) is said to be feasible.

3.3 Symbolic Evaluation

Next, the discussion turns to the symbolic execution, such as in the common intermediate language (e.g., CIL).

One-Step Transition

The one-step relation

→ ⊆ (State×Constraints)×(State×Constraints)

describes the effect of the current instruction from a given constrained state (S, C). The most interesting cases are the following ones. Suppose the current instruction is a new object creation of type T. Let o∈ObjectId−O(S) be a fresh object identifier. Then (S, C)→(S', C∧type(o)=T) where S' is like $S^{+1}$ except that the extensional heap $H_e$(S) is replaced with update(... update($H_e$(S),field$_{f1}$(o),$v_1$) ..., field$_{fn}$(o), $v_n$)

where $f_1, \ldots, f_n$ are the fields of type T and $v_1, \ldots, v_n$ their default values, e.g. 0 for an integer field. The current instruction in S' must be a call to a constructor of T.

conditional branch with a condition c and label l. If (S, C∧c) is feasible, then (S, C)→(S, C∧c) where the program counter in S' is set to l. If (S, C∧¬c) is feasible, then $(S, C) \rightarrow (S^{+1}, C \wedge \neg c)$. Note that these cases are not exclusive and thus symbolic execution might explore both branches.

member access with target expression t and result location r. If $(S, C \wedge t \neq null)$ is feasible, then the normal behavior is $(S, C) \rightarrow (S, C \wedge t \neq null)$ where S' is like $S^{+1}$ except that the location r holds the expression select($H_e(S)$, field$_f(t)$). But if $(S, C \wedge t = null)$ is feasible as well, then there is also the exceptional transition $(S, C) \rightarrow (S'', C \wedge type(e) = NullReferenceException \wedge t = null)$ where S'' is like S except that the current exception references a new exception object e and the program counter is advanced to the next exception handler.

Assume.IsTrue with condition c. If $(S, C \wedge c)$ is feasible, then $(S, C) \rightarrow (S^{+1}, C \wedge c)$. Otherwise, there is no successor of $(S, C)$.

Assert.IsTrue with condition c. This instruction is semantically equivalent to the following code fragment:

if (!c) throw new AssertFailedException( );

Exploration

On top of the $\rightarrow$ relation, several exploration strategies like depth-first search and breadth-first search can be built. A bounded depth-first search is used by default, which unfolds loops and recursion only a fixed number of times using a standard set of heuristics to explore only some of the paths.

3.4 Axioms

There are two views on a parameterized unit test: It can be seen as a generator of test cases for an implementation, and as a summary or axioms, of external behavior.

This subsection describes how uninterpreted function symbols are used to represent summaries, and how to generate universally quantified formulas from a parameterized unit test. These formulas can then be used by the theorem prover and or constraint solver to reason about the externally observable method behavior.

Assume that it would be desirable to summarize a set of methods M of class D. This can be provided by decorating a test class $T_D$, which contains a set of test axioms over the methods M of class D, with the attribute [ProvidingAxioms (typeof(D))]. Then other test classes will reuse these axioms when they are decorated with the attribute [UsingAxioms (typeof($T_D$))].

For method calls to M the behavior of $\rightarrow$ is further refined. Suppose the current instruction in $(S, C)$ is:

a call to a method $m \notin M$, with actual arguments $\bar{x}$. Let $H'_i = m_s(H_i(S), \bar{x})$. If $(S, C \wedge m_x(H_i(S), \bar{x}) = void)$ is feasible, then there is a normal successor with incremented program counter and intensional heap $H'_i$. The return value of a normal execution of m (if any) is given by the expression $m_r(H_i(S), \bar{x})$. If $(S, C \wedge m_x(H_i(S), \bar{x}) \neq void)$ is feasible, then there is an abrupted successor with intensional heap $H'_i$ which throws an exception of type $m_x(H_i(S), \bar{x})$ and advances to the next exception handler accordingly.

Axioms for Normal Behavior

Axiom formulas for normal behavior can be generated by exploring a test axiom method (e.g., a parameterized unit test), such as was done for test case generation, but instead of checking that an assertion holds, the assertions are turned into axiom formulas. More formally: The arguments of the test axiom method are instantiated with a vector $\bar{x}$ of free variables. The test axiom method is explored with a modified one-step relation $\rightarrow'$, starting with a variable intensional heap h. $\rightarrow'$ is like $\rightarrow$ except that calls to Assert.IsTrue(c) are treated like calls to Assume.IsTrue(c). In addition whenever a call to Assert.IsTrue(c) is encountered in $(S, C)$ a new axiom formula, such as $$\forall h, \bar{x}.PC(C) \rightarrow c$$

is generated and conjoined with the background BG(C) for further explorations. Note that both the path condition PC(C) and the assertion c might refer to the variable h and the free variables $\bar{x}$.

For example, the TestAdd axiom from Section 2.2 is used to illustrate the axiom formula generation process.

| [TestAxiom] | |
|---|---|
| void TestAdd(ArrayList a, object o) { | // 0 |
|     Assume.IsTrue(a!=null); | // 1 |
|     int i = a.Count; | // 2 |
|     a.Add(o); | // 3 |
|     Assert.IsTrue(a[i] == o); | // 4 |
| } | |

The above TestAxiom is explored state by state, with the symbolic variables (e.g., free variables) a, o as arguments, and starting with an h variable representing the intensional heap. Table D describes the resulting constraints after each statement labeled 0 through 4 in the test axiom and in Table D. The ellipses denote that an expression didn't change from step i to i+1.

TABLE D

| | Path conditions | Intensional heap | Local binding |
|---|---|---|---|
| 0 | (a = null $\vee$ type(a) = ArrayList), | $h_0 = h$ | |
| 1 | ... $\wedge$ a $\neq$ null | ... | |
| 2 | ... | $h_1 = getCount_s(h_0, a)$ | $i = getCount_r(h_0, a)$ |
| 3 | ... | $h_2 = Add_s(h_1, a, o)$ | ... |
| 4 | ...$\wedge$ getItem$_r$(h2, a, i) = o | ... | |

Exploring TestAdd generates the following universally quantified formula:

| | |
|---|---|
| $\forall$ h, a, o. | (a = null $\vee$ subtype(type(a), ArrayList)) $\wedge$ a $\neq$ null $\rightarrow$ getItem$_r$( Add$_s$(getCount$_s$(h, a), a, o), a, getCount$_r$(h, a)) = o |

Practically, the summary states behavior that should hold later when another symbolic execution relies on the summary to emulate "Add" behavior for an ArrayList.

Axioms for Exceptional Behavior

Next, formulas for evaluating exceptions are considered. A parameterized unit test method must not throw an exception unless it is decorated with a special attribute [ExpectedException(typeof(T))]. In this case the test method must throw an exception compatible with type T at some time during the execution of this unit test. Additionally, when a test method has an attribute [ExpectedException( . . . )], then the expected exception must be thrown by the last call to a method in M. Further, exception handling code is not allowed in parameterized unit tests which are intended to provide axioms (e.g., summarized methods).

To generate axiom formulas reflecting the presence or absence of exceptions, the following is adopted. Assume that a test method with attribute [ExpectedException(typeof(T))] is being explored starting with a variable intensional heap h and variable arguments $\bar{x}$. When the last call to a method $m \in M$ with actual arguments $\bar{y}$ in a constrained state (S, C) is encountered in a PUT, then the following axiom formula is provided, $$\forall h, \bar{x}. PC(C) \rightarrow subtype(m_x(H_i(S), \bar{y}), T)$$

which states that an exception whose type is compatible with type T will be thrown under the path condition. For each other call to a method $m \in M$ with arguments $\bar{y}$ appearing in any parameterized test method in a constrained state (S, C), the following axiom formula is generated, $$\forall h, \bar{x}. PC(C) \rightarrow m_x(H_i(S), \bar{y}) = void$$

which states that $m(\bar{y})$ doesn't throw an exception when called under the path condition.

Consider the following example.

```
[TestAxiom, ExpectedException(
        typeof(ArgumentNullException))]
void TestAdd(Hashtable ht, object o) {
    Assume.IsTrue(ht!=null);
    ht.Add(null, o);
}
```

This axiom states that the Add method of a hash table must not be applied to a null key, and that an appropriate exception will be thrown otherwise. The corresponding axiom formula is

```
∀ h, ht, o.        (ht = null ∨ subtype(type(ht), Hashtable))
                 ∧ ht ≠ null →
                         subtype(Add_x(h, ht, null, o),
                                 ArgumentNullException)
```

Axioms for Behavioral Purity

Existing unit test frameworks do not support notations to specify that a method invocation is behaviorally pure, which means that it does not affect the externally visible behavior of any later method invocation.

This behavior is useful for these kinds of parameterized unit tests in the context of axiom reuse. Often, specifications would be incomplete without assertions about behavioral purity.

The specification of behaviorally purity is supported by means of a special attribute [ExpectedBehavioralPurity], which can be attached to parameterized unit tests.

Behavioral purity axiom formulas, are generated as follows: Assume that a test method with attribute [ExpectedBehavioralPurity] is being explored starting with variable intensional heap h and variable arguments $\bar{x}$. When an instruction indicating the (normal or abrupt) exit of the test method in a constrained state (S, C) is encountered, the following axiom formula is generated, $$\forall h, \bar{x}. PC(C) \rightarrow H_i(S) = h$$

which states that, for all initial intensional heaps and test method arguments, the final intensional heap can be equated with the initial intensional heap under the path condition.

In Section 2.5, axioms for the hash table were introduced. The following two purity axioms can be added.

```
[TestClass, ProvidingAxioms(typeof(Hashtable))]
class HashtableTests {
    ...
    [TestAxiom, ExpectedBehavioralPurity]
    void ContainsIsPure(Hashtable h, object key) {
        Assume.IsTrue(h!=null && key!=null);
        bool result = h.ContainsKey(key);
    }
    [TestAxiom, ExpectedBehavioralPurity]
    void GetIsPure(Hashtable h, object key) {
        Assume.IsTrue(h!=null && key!=null);
        object result = h[key];
    }
}
```

Together, these four hash table axioms are sufficient to explore the AddMultiplicityTest of Section 2.5 without resorting to the hash table implementation.

This approach allows specification of behavioral purity not only for single method invocations, but also for the combined effect of a sequence of method invocations. Consider the following example, which states that, if a key is not in a hash table, then adding and removing this key will leave the hash table in the same state as it was initially.

```
class HashtableTests {
    ...
    [TestAxiom, ExpectedBehavioralPurity]
    void AddRemoveIsPure(
        Hashtable h, object key, object val) {
            Assume.IsTrue(h!=null && key!=null);
            Assume.IsTrue(!h.ContainsKey(key));
            h.Add(key, val);
            h.Remove(key);
    }
}
```

3.5 Test Case Generation

Each transition sequence $(S_0, C_0) \rightarrow (S_1, C_1) \rightarrow \ldots$ represents a unique execution path of the program. In this subsection, only finite execution paths are considered. A path is deemed terminated if it ends in a state with an empty stack of activation records.

A test case is now simply an assignment that is (together with a fixed interpretation) a solution of the last constrained state of a terminating path. By choosing one assignment per terminated execution path, the minimal number of test cases that cover all explored execution paths are provided.

A test case is deemed successful if either the last state of the test case's path has no current exception and no [ExpectedException( . . . )] attribute is given, or the last state has a current exception whose type is compatible with type T of a given [ExpectedException(T)] attribute. Otherwise the test case failed, and the current exception in the last state indicates the kind of failure. It could be an assertion failure or another implicit failure.

In general, the constraint solver decides feasibility of constraints. If a formula is not satisfiable, the theorem provers might produce a counter example. In this case the verdict is clearly that the path represented by the formula is infeasible. However sometimes, the theorem provers can neither prove nor disprove the formula. In this case the verdict is inconclusive and the exploration continues as if the path was feasible.

Later, when the constraint solver tries to obtain concrete solutions, it might turn out that no solution exists.

For certain formulas, some theorem provers like Zap support model generation, i.e. the generation of assignments that fulfill the formulas. The theorem prover Simplify does not support model generation, and we have to provide additional domain information. Linear and binary search techniques are used to narrow down the space of potential solutions to a particular assignment. For instance, for free object variables the program enumerate through the available object identifiers and the null value to find solutions.

Existing theorem provers cannot reason about modulo and division. In order to efficiently reason about these operations, as required e.g. to explore the hash table code, modulo and division are transformed by a constant into equivalent disjunctions. For example, the expression (i mod 10) with the constraint i∈{0, ..., 29} in the path condition is replaced by the expression (i−d) and the following constraint is added to the path condition.

$$
\begin{array}{ll}
& (0 \leq i < 10 \ \wedge \ d = 0) \\
\vee & (10 \leq i < 20 \ \wedge \ d = 10) \\
\vee & (20 \leq i < 30 \ \wedge \ d = 20)
\end{array}
$$

If division and modulo operations are used, a finitization, here a range, are given for the free variables involved.

Section 4

Evaluation

Parameterized unit tests were written for several algorithms and collection types and test cases were generated:

Quicksort is a recursive algorithm sorting an integer array. Quicksort was tested with arrays of size 4, 5, and 6.

Another function classifies a triangle, given by the lengths of its three sides, into one of the categories equilateral, isosceles, scalene, and invalid.

The ArrayList, its enumerator, and the Hashtable data type were taken from the NET Framework Version 1.1, with minor modifications to allow symbolic execution within the capabilities of the theorem provers we were using. In particular, the hash table was using bit operations to manipulate the highest bit of hash values to encode collisions. A separate boolean flag was introduced for this purpose. The array list was tested with inputs of sizes up to 10. The enumerator was tested for up to 4 elements, and the hash table for up to 2 contained elements.

The Bag data type was implemented on top of Hashtable as outlined in this paper. Its axioms were tested once without reusing hash table axioms ("deep"), and once with reusing ("shallow") as shown in Table E.

The LinkedList and RedBlackTree data types were taken from an early version of a collection library, in which they are private classes used for the implementation of the Map data type. The assertions for the red-black tree operations include that they maintain the red-black tree invariant. Linked list operations were tested up to a depth of 10, red-black tree operations with up to 8 involved nodes, which includes nodes created during the operations.

Table E shows the results for exemplary algorithms, and Table F shows results for the data type operations.

The tables give the number of operations tested, the number of parameterized unit tests (PUTs) written, separating normal from exceptional behavior tests for data type operations. The number of concrete test cases that were automatically generated from the parameterized unit tests are given. The results were 100% coverage of the reachable branches of the tested operations in every case. Finally, the time it took to generate all cases on a Pentium 4, 3.2 GHz is provided. Memory consumption was not a concern since a bounded depth-first search was performed. Automatic test case generation found three violations of the parameterized unit tests.

The following parameterized unit test was written:

```
[TestAxiom]
void SetCapacityTest(ArrayList a, int i) {
    Assume.IsTrue(a!=null && i>=a.Count);
    a.Capacity = i;
    if (i==0) Assert.IsTrue(a.Capacity==16);
    else Assert.IsTrue(a.Capacity==i);
}
```

Symbolic execution finds that the first assertion fails when a._size==0, a.items.Length==0, and i==0 initially. In this case the capacity is not set to the default capacity, but left unchanged.

A bug was identified in the enumerator of ArrayList with the following parameterized unit tests describing the normal iteration behavior (In fact, this axiom is applicable to every implementer of the IList interface):

```
[TestAxiom]
void IterateTest(ArrayList a) {
    Assume.IsTrue(a != null);
    IEnumerator e = a.GetEnumerator( );
    for (int i = 0; i < a.Count; i++) {
        Assert.IsTrue(e.MoveNext( ) &&
            e.Current == a[i]);
    }
    Assert.IsTrue(!e.MoveNext( ));
}
```

Symbolic execution reveals that an exception will be thrown by the Current property getter if, beside other constraints, a._items[0]==a.

A robustness test of the static Remove method of the LinkedList class was written as follows:

```
[TestAxiom]
void RemoveTest(LinkedList l, object o) {
    LinkedList res = LinkedList.Remove(l, o);
}
```

Symbolic execution finds that the Remove method throws a NullReferenceException while accessing n.tail.tail when n.tail==null, where n ranges over all (non-null) linked lists which do not contain o.

TABLE E

| Algorithm | Input size | PUTs | # Cases | Time |
|---|---|---|---|---|
| Quicksort | int[4] | 2 | 24 | 0.3 s |
| Quicksort | int[5] | 2 | 120 | 1.2 s |
| Quicksort | int[6] | 2 | 720 | 8.8 s |
| Triangle | Sides | 4 | 9 | 0.2 s |

TABLE F

| Datatype | Operations | Input Size | Normal PUTs | Except. PUTs | # Cases | Time |
|---|---|---|---|---|---|---|
| ArrayList | 10 | 3 | 8 | 4 | 34 | 3.6 s |
| Enumerator | 4 | 4 | 4 | 6 | 67 | 9.8 s |
| Hashtable | 9 | 2 | 6 | 5 | 30 | 29.9 s |
| Bag (deep) | 3 | Any | 3 | 3 | 20 | 37.2 s |
| Bag (shallow) | 3 | Any | 3 | 3 | 9 | 2.3 s |
| LinkedList | 3 | 10 | 3 | 0 | 64 | 3.6 s |
| RedBlackTree | 3 | 8 nodes | 3 | 0 | 457 | 427 s |

Exemplary Computing Environment

Figure 6:
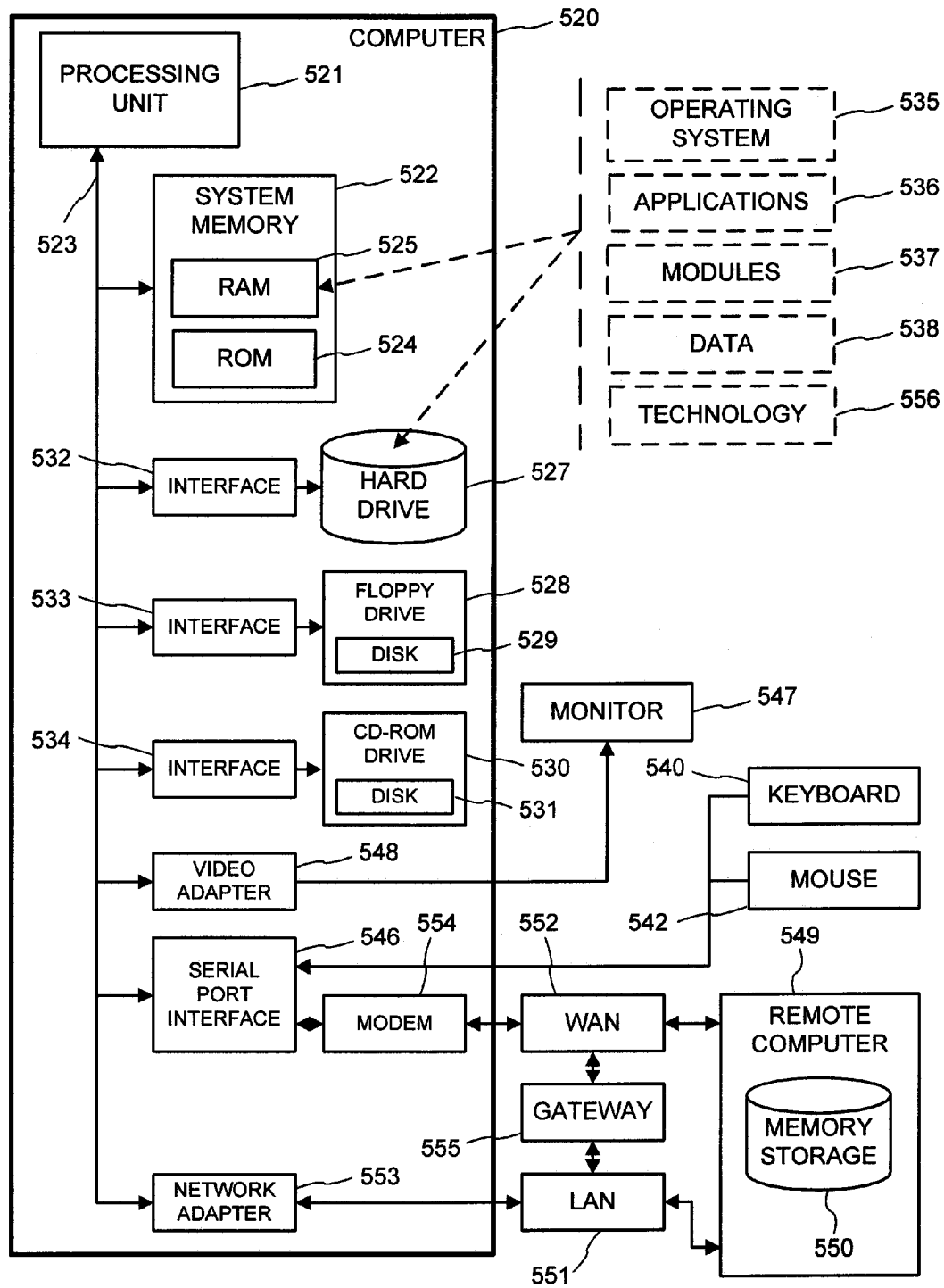
FIG. 6 is a block diagram of a distributed computer system supporting parameterized unit testing.

FIG. 6 and the following discussion are intended to provide a brief, general description of a suitable computing environment for an implementation. While the invention will be described in the general context of computer-executable instructions of a computer program that runs on a computer and/or network device, those skilled in the art will recognize that the invention also may be implemented in combination with other program modules. Generally, program modules include routines, programs, components, data structures, etc. that performs particular tasks or implement particular abstract data types. Moreover, those skilled in the arts will appreciate that the invention may be practiced with other computer system configurations, including multiprocessor systems, microprocessor-based electronics, minicomputers, mainframe computers, network appliances, wireless devices, and the like. The extensions can be practiced in networked computing environments, or on stand-alone computers.

With reference to FIG. 6, an exemplary system for implementation includes a conventional computer 520 (such as personal computers, laptops, servers, mainframes, and other variety computers) includes a processing unit 521, a system memory 522, and a system bus 523 that couples various system components including the system memory to the processing unit 521. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 521.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 524 and random access memory (RAM) 525. A basic input/output system (BIOS), containing the basic routines that help to transfer information between elements within the computer 520, such as during start-up, is stored in ROM 524.

The computer 520 further includes a hard disk drive 527, a magnetic disk drive 528, e.g., to read from or write to a removable disk 529, and an optical disk drive 530, e.g., for reading a CD-ROM disk 531 or to read from or write to other optical media. The hard disk drive 527, magnetic disk drive 528, and optical disk drive 530 are connected to the system bus 523 by a hard disk drive interface 532, a magnetic disk drive interface 533, and an optical drive interface 534, respectively. The drives and their associated computer-readable media provide nonvolatile storage of data, data structures, computer-executable instructions, etc. for the computer 520. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 525, including an operating system 535, one or more application programs 536, other program modules 537, and program data 538; in addition to an implementation of the described parameterized unit testing 556.

A user may enter commands and information into the computer 520 through a keyboard 540 and pointing device, such as a mouse 542. These and other input devices are often connected to the processing unit 402 through a serial port interface 546 that is coupled to the system bus, but may be connected by other interfaces, such as a parallel port, game port or a universal serial bus (USB). A monitor 547 or other type of display device is also connected to the system bus 523 via an interface, such as a video adapter 548. In addition to the monitor, computers typically include other peripheral output devices (not shown), such as speakers and printers.

The computer 520 operates in a networked environment using logical connections to one or more remote computers, such as a remote computer 549. The remote computer 549 may be a server, a router, a peer device or other common network node, and typically includes many or all of the elements described relative to the computer 520, although only a memory storage device 550 has been illustrated. The logical connections depicted include a local area network (LAN) 551 and a wide area network (WAN) 552. Such networking environments are commonplace in offices, enterprise-wide computer networks, intranets and the Internet.

When used in a LAN networking environment, the computer 520 is connected to the local network 551 through a network interface or adapter 553. When used in a WAN networking environment, the computer 520 typically includes a modem 554 or other means for establishing communications (e.g., via the LAN 551 and a gateway or proxy server 555) over the wide area network 552, such as the Internet. The modem 554, which may be internal or external, is connected to the system bus 523 via the serial port interface 546. In a networked environment, program modules depicted relative to the computer 520, or portions thereof, may be stored in the remote memory storage device. It will be appreciated that the network connections shown are exemplary and other means of establishing a communications link between the computing devices may be used, wireless or otherwise.

Alternatives

Having described and illustrated the principles of this technology with reference to illustrated examples, it will be recognized that the examples can be modified in arrangement and detail without departing from such principles. Additionally, as will be apparent to ordinary computer scientists, portions of the examples or complete examples can be combined with other portions of other examples in whole or in part. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa. Techniques from one example can be incorporated into any of the other examples.

In view of the many possible embodiments to which the principles of these features may be applied, it should be recognized that the details are illustrative only and should not be taken as limiting the scope of the claims. Rather, we claim as our invention all such embodiments as may come within the scope and spirit of the following claims and equivalents thereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computerized method comprising:
receiving a parameterized unit test, wherein the parameterized unit test accepts a plurality of input parameters and comprises a series of program statements and one or more assertions verifying program behavior;
creating a graph comprising nodes that represent respective constraints on symbolic inputs to the parameterized unit test;
symbolically executing, in a computer, the parameterized unit test of an implementation under test to identify a plurality of paths of constraints in the graph as respective path conditions, wherein symbolically executing the parameterized unit test comprises (a)-(b):
(a) assigning symbolic input variables to parameters of the parameterized unit test and performing operations on symbolic values; and
(b) for a given path of constraints in the graph, adding the constraints in the given path to a respective path condition, wherein the respective path condition is expressed in terms of the symbolic input variables;
responsive to encountering the one or more assertions in the parameterized unit test, generating universally quantified formulas from the parameterized unit test, wherein the universally quantified formulas symbolically summarize methods of the parameterized unit test, state that a condition of a given assertion must hold under an aggregated path condition at a time of the given assertion, and comprise
a behavioral purity axiom that requires that an intensional heap before execution of the parameterized unit test and the intensional heap after execution of the parameterized unit test be equal; and
responsive to encountering an indication that behavioral summaries are to be used, re-using the universally quantified formulas in a symbolic execution.

2. The method of claim 1 further comprising:
generating automated test cases comprising solving for concrete assignments to the plurality of input parameters of the parameterized unit test that satisfy respective paths of constraints in the graph, according to the path conditions; and
executing the parameterized unit test using the automated test cases as input parameters; and
verifying whether executing the parameterized unit test with the automated test cases conforms to an assert statement.

3. The method of claim 1 further comprising creating axioms summarizing behavior of methods in the parameterized unit test.

4. The method of claim 1 wherein the parameterized unit test includes a method textually decorated to reuse axioms, and wherein symbolically executing the parameterized unit test comprises symbolically executing plural of the program statements and emulating at least one method call summarized by axioms.

5. The method of claim 4 wherein a separate heap is used to record the emulated at least one method call.

6. The method of claim 4 wherein the emulated at least one method is a summarized method for which at least one axiom was created from previous symbolic execution of another parameterized unit test.

7. The method of claim 1 further comprising:
generating automated test cases comprising solving for concrete assignments to the plurality of input parameters of the parameterized unit test that satisfy respective paths of constraints in the graph, according to the path conditions;
wherein the automated test cases exercise all paths of constraints in the graph through an implementation under test.

8. A system for testing programs comprising:
a digital processor; and
digital memory tangibly embodying computer executable program instructions comprising:
a parameterized unit test wherein the parameterized unit test accepts a plurality of input parameters and comprises a series of program statements and one or more assertions verifying program behavior;
an implementation under test;
instructions processing a graph comprising nodes that represent respective constraints on symbolic inputs to the parameterized unit test;
a symbolic executor symbolically executing the parameterized unit test of the implementation under test to identify a plurality of paths of constraints in the graph as respective path conditions, wherein symbolically executing the parameterized unit test comprises (a)-(b):
(a) assigning symbolic input variables to parameters of the parameterized unit test and performing operations on symbolic values; and
(b) for a given path of constraints in the graph, adding the constraints in the given path to a respective path condition, wherein the respective path condition is expressed in terms of the symbolic input variables;
logic for, responsive to encountering the one or more assertions in the parameterized unit test, generating universally quantified formulas from parameterized unit tests, wherein generated universally quantified formulas symbolically summarize methods of the parameterized unit test, state that a condition of a given assertion must hold under an aggregated path condition at a time of the given assertion, and
a behavioral purity axiom that requires that an intensional heap before execution of the parameterized unit test and the intensional heap after execution of the parameterized unit test be equal;
logic for, responsive to encountering an indication that behavioral summaries are to be used, re-using the universally quantified formulas in a symbolic execution, and
a constraint solver that generates a set of test cases by solving for concrete assignments to the plurality of input parameters of the parameterized unit test that satisfy the respective paths of constraints in the graph, according to the path conditions.

9. The system of claim 8 wherein the digital memory further comprises a heap which includes an intensional portion and an extensional portion and wherein the extensional portion comprises a history of memory location updates and the intensional portion comprises a collection of summarized method calls.

10. The system of claim 8 wherein the symbolic executor uses summarized methods during symbolic execution when a parameterized unit test is decorated with a textual indication of using axioms.

11. The system of claim 8 wherein the symbolic executor emulates at least one method using axioms created as a result of symbolic execution of another parameterized unit test.

12. The system of claim 8 wherein the parameterized unit test can not be compiled and run by itself because it does not include concrete input arguments.

13. The system of claim 8 further comprising:
a graphical user interface; and
a keyboard used in conjunction with the graphical user interface to receive user defined candidate values which fulfill a path condition.

14. A computer readable medium tangibly embodying computer executable instructions comprising:
instructions for receiving a parameterized unit test of an implementation under test, wherein the parameterized unit test accepts a plurality of input parameters and comprises a series of program statements and one or more assertions verifying program behavior;
instructions for creating a graph comprising nodes that represent respective constraints on symbolic inputs to the parameterized unit test;
instructions for symbolically executing the parameterized unit test to identify a plurality of paths of constraints in the graph as respective path conditions, wherein symbolically executing the parameterized unit test comprises (a)-(b):
(a) assigning symbolic input variables to parameters of the parameterized unit test and performing operations on symbolic values; and
(b) for a given path of constraints in the graph, adding the constraints in the given path to a respective path condition, wherein the respective path condition is expressed in terms of the symbolic input variables;
instructions for, responsive to encountering the one or more assertions in the parameterized unit test, generating universally quantified formulas from parameterized unit tests, wherein generated universally quantified formulas symbolically summarize methods of the parameterized unit test, state that a condition of a given assertion must hold under an aggregated path condition at a time of the given assertion, and include
a behavioral purity axiom that requires that an intensional heap before execution of the parameterized unit test and the intensional heap after execution of the parameterized unit test be equal;
instructions for generating test cases comprising solving for concrete assignments to the plurality of input parameters of the parameterized unit test that satisfy the respective paths of constraints in the graph, according to the path conditions; and
instructions for verifying the implementation under test by executing the generated test cases on the input parameters of the parameterized unit test.

15. The computer readable medium of claim 14 further comprising:
instructions for creating axioms summarizing behavior of methods in the parameterized unit test; and
instructions for emulating at least one method call due to a textual decoration indicating axiom re-use.

16. The computer readable medium of claim 14 further comprising:
instructions for determining that a method is textually decorated to reuse axioms; and
instructions for causing emulation of methods because of textual decorations indicating to re-use axioms.

17. The computer readable medium of claim 14 further comprising: instructions for populating an extensional heap with updates; and
instructions for generating axiom formulas upon encountering assert statements in the parameterized unit test.

18. One or more computer-readable media tangibly embodying computer executable instructions for performing a method of processing a parameterized unit test, wherein the parameterized unit test accepts a plurality of input parameters and comprises a series of program statements and one or more assertions verifying program behavior, wherein the method comprises:
creating a graph comprising nodes that represent respective constraints on symbolic inputs to the parameterized unit test;
symbolically executing, in a computer, the parameterized unit test of an implementation under test to identify a plurality of paths of constraints in the graph as respective path conditions, wherein symbolically executing the parameterized unit test comprises (a)-(b):
(a) assigning symbolic input variables to parameters of the parameterized unit test and performing operations on symbolic values; and
(b) for a given path of constraints in the graph, adding the constraints in the given path to a respective path condition, wherein the respective path condition is expressed in terms of the symbolic input variables;
responsive to encountering the one or more assertions in the parameterized unit test, generating at least one universally quantified formula from the parameterized unit test, wherein the at least one universally quantified formula symbolically summarizes methods of the parameterized unit test, states that a condition of a given assertion must hold under an aggregated path condition at a time of the given assertion, and comprises a behavioral purity axiom that requires that an intensional heap before execution of the parameterized unit test and the intensional heap after execution of the parameterized unit test be equal;
generating automated test cases comprising solving for concrete assignments to the plurality of input parameters of the parameterized unit test that satisfy the respective paths of constraints in the graph, according to the path conditions, wherein the generating transforms modulo into equivalent disjunctions by a constant; and
verifying the implementation under test by executing the generated automated test cases on the input parameters of the parameterized unit test.

19. The computerized method of claim 1 wherein:
the universally quantified formulas further comprise an exception axiom that requires an exception thrown from the parameterized unit test to be compatible with an indicated exception type.

20. The system for testing programs of claim 8 wherein:
the universally quantified formulas further include an exception axiom that requires no uncaught exceptions be thrown from the parameterized unit test.

* * * * *